Patented May 6, 1941

2,241,255

UNITED STATES PATENT OFFICE 2,241,255

OIL BASE DRILLING FLUID

Allen D. Garrison, Houston, Tex., assignor to The Texas Company, New York, N. Y., a corporation of Delaware No Drawing. Application August 17, 1939, Serial No. 290,632

16 Claims. (Cl. 255—1)

This invention relates to drilling fluids for drilling oil or gas wells, and more particularly non-aqueous drilling fluids.

More specifically, my invention relates to the preparation of a drilling fluid comprising a petroleum hydrocarbon oil, oil-wettable suspended solids, and a small proportion of a dispersed oil-insoluble bitumen, such, for example, as sulphurized asphalt. Drilling fluids prepared in accordance with my invention are stable dispersions in that the solids contained therein do not readily settle out, and when used in the drilling of wells they yield filter cakes of low permeability.

Drilling fluids are used in the drilling of wells employed for tapping underground collections of oil, gas, brines or water. These fluids fulfill various functions, the most important of which are to seal off formations of gas, oil and water which may be encountered at various levels, to assist in the removal of cuttings from the well, and to lubriate the drilling tool and the drill pipe which carries the tool.

The most common type of drilling fluid is the drilling mud which consists essentially of a dispersion of a finely divided solid such as clay in water, the weight of the mud usually varying between 8 and 12 pounds per gallon.

In addition to contributing to the density of the drilling fluid, one of the important functions of the suspended solids is that of forming a thin impermeable deposit or filter cake on the permeable sections of the earth penetrated during drilling. It is desirable to have this filter cake as impermeable as possible to the flow of fluid from the well bore outwardly into the permeable earth formation. Of recent years it has been recognized that when completing a well in an oil bearing formation with the use of a drilling mud that the filter cake laid down by the drilling mud may make it difficult to establish a satisfactory flow of oil from the producing formation inwardly to the well bore. In some cases the filter cake can be removed by mechanical treatment as by scraping or reaming, but in those cases where the filter cake has penetrated into the producing formation it is often impossible to completely remove the filter cake and to establish an unobstructed flow of oil or gas.

Furthermore, a second disadvantage to the use of the usual drilling muds is that the filter cakes deposited upon the walls of the bore hole opposite the sands which contain oil are never completely impermeable to the flow of water. During the process of drilling in and completing the well it is known that water enters through this filter cake into the sand from which oil must flow. This penetration of water into the sand makes it more difficult for the oil to enter the well bore.

In order to overcome the aforementioned difficulties the use of oil base drilling fluids has been proposed, but these fluids too have been characterized by certain serious shortcomings, the principal one of which is the difficulty in preparation of suspensions having satisfactory filter cakes insofar as the filter cakes formed therefrom are too highly permeable to oil during the drilling operation. This results, when drilling through highly permeable formations, in a rapid loss of the oil base of the drilling fluid through the filter cake into the formation and a consequent increase in the solid content of the drilling fluid. This increase in the solid content of the drilling fluid occurs locally within the well bore and constitutes in effect a substantial reduction of the diameter of the hole at that point. This reduction in diameter brings about difficulties during further drilling and during the removal of the drill stem and bit when such removal becomes necessary.

The aforementioned oil base drilling fluids have also been characterized by the further disadvantage that the filter cakes which are best in regard to low permeability during drilling are as difficult to remove from the walls of the well bore as the filter cakes laid down by the usual drilling muds.

I have discovered an oil base drilling fluid which not only yields filter cakes which are substantially impermeable to the outward flow of oil during the drilling and completion procedure, but which in addition have the added advantage of being rendered permeable to the inward flow of oil by treatment with an inexpensive solvent.

The oil base drilling fluid discovered by me is prepared by suspending in a suitable petroleum hydrocarbon oil a desired amount of an oil-wettable, finely divided solid such as an adsorbent spent in the treatment of petroleum hydrocarbon oils, or finely divided carbon such as lamp black or carbon black, or finely divided pigments such as litharge, zinc sulphide, barium sulphate and the like, or any mixture of these oil wettable solids and a small proportion of dispersed oil-insoluble bitumen such as sulphurized asphalt. I have found that the only limitation which need be placed on the selection of the petroleum hydrocarbon oil is that it be more viscous than kerosene or light gas oil and that it be readily pumpable. Satisfactory oils for this include heavy gas oils, fuel oils and crude oils.

As the oil-wettable solid, I prefer the use of finely divided adsorbents spent in the contacting of lubricating oil stocks. These materials usually have a fineness in the neighborhood of 200 mesh or smaller. The oil-insoluble bitumen which I prefer to use in the practice of my invention is prepared by heating asphalt with sulphur at elevated temperatures until the reaction product becomes insoluble in petroleum hydrocarbon oils such as kerosene, gas oil or crude oil. A method of preparing a suitable oil-insoluble bitumen consists in heating together a heavy petroleum hydrocarbon oil such as cycle fuel oil with from 3 to 10% of sulphur at a temperature in the range of from 350 to 450° F. for a period of from 4 to 5 hours. The product resulting from this reaction is a non-viscous solid. In the preparation of the sulphurized product it is possible to use materials such as coal tar, pitch and cracked petroleum residues such as are derived from petroleum hydrocarbon oil cracking operations.

In employing these materials I have found it advantageous to dissolve the oil-insoluble bitumen in a solvent such as xylene, toluene, chlorinated aromatic solvents such as chlorbenzene and nitrated aromatic solvents such as nitrobenzene. Also certain chlorinated aliphatic solvents such as carbon tetrachloride or other solvents of high solvent power such as carbon disulphide may be used.

As a specific example of the practice of my invention I give herewith a description of a drilling fluid prepared in accordance with my invention. The drilling fluid was prepared from Ganado crude obtained from the Ganado field in Texas, this crude having a gravity of approximately 26° Bé. To this oil there was added approximately 10% by weight of acid treated clay which had become spent in the treatment of lubricating oil in the hot contacting process. The clay originated in a commercial deposit near Lena, Texas. There was suspended in the mixture 2% by weight of lamp black together with about 6% by weight of sulphurized cycle fuel oil, the latter being added in the form of a 20% solution in carbon tetrachloride. The drilling fluid prepared in this manner was relatively stable in that very little separation of the solid content took place. In conducting a filter rate test on a sample of the drilling fluid, 300 cubic centimeters of the fluid were placed in a filter press fitted with a two inch diameter felt filter and a pressure of 1,000 pounds per square inch applied. The rate of flow of oil through the filter pad was measured with the following results:

| At end of— | Oil filtered |
| --- | --- |
|  | Cubic centimeters |
| 1 minute | 8 |
| 7 minutes | 12 |
| 15 minutes | 15 |
| 20 minutes | 16.5 |
| 30 minutes | 19 |

The above filter rate test compared favorably with the results obtained with some of the best drilling muds insofar as permeability is concerned. After this test was completed the filter press was opened and 50 cubic centimeters of xylene were put into the cylinder on the cake. The oil-insoluble bitumen was rapidly dissolved out of the filter cake and on testing the permeability of the cake it was found that the flow of oil through the cake was so rapid that it could not be accurately estimated.

For purposes of comparison I give herewith the filter rate tests on a drilling fluid prepared from Ganado crude oil, spent adsorbent and carbon black in substantially the same proportions as those shown in the foregoing example. In this case the filter rate test conducted under the same conditions as in the foregoing example showed a delivery of 58 cubic centimeters of oil in 30 seconds. The flow of oil was so rapid that the test was discontinued.

Although in the example I have shown the use of the ingredients in certain definite proportions, I do not intend to limit myself to those proportions or the particular oil wettable solids shown but contemplate the use of varying proportions of finely divided oil-wettable solids, the quantities used being dictated by the desired weight of the drilling fluid, the only limitation being that the suspension be sufficiently fluid to be pumpable. Insofar as the oil-insoluble bitumen is concerned, I prefer to employ from ½ to 10% by weight of this material, but it is to be understood that special conditions may necessitate the use of smaller or larger percentages of this material.

Obviously many modifications and variations of the invention as hereinbefore set forth may be made without departing from the spirit and scope thereof, and therefore only such limitations should be imposed as are indicated in the appended claims.

I claim:

1. An oil base drilling fluid comprising a petroleum hydrocarbon oil, a finely divided oil-wettable solid and dispersed oil-insoluble bitumen.

2. An oil base drilling fluid comprising a petroleum hydrocarbon oil, spent adsorbent and dispersed oil-insoluble bitumen.

3. An oil base drilling fluid comprising a petroleum hydrocarbon oil, spent adsorbent, finely divided carbon and dispersed oil-soluble bitumen.

4. An oil base drilling fluid comprising a petroleum hydrocarbon oil, finely divided carbon and dispersed oil-insoluble bitumen.

5. An oil base drilling fluid comprising a petroleum hydrocarbon oil, finely divided oil-wettable pigment and dispersed oil-insoluble bitumen.

6. An oil base drilling fluid comprising a petroleum hydrocarbon oil, spent adsorbent, carbon black and a small proportion of dispersed sulphurized asphalt, said drilling fluid being characterized by yielding substantially oil-impermeable filter cakes which on treatment with a solvent for the sulphurized asphalt are rendered permeable to the flow of oil.

7. An oil base drilling fluid comprising a petroleum hydrocarbon oil, spent adsorbent and minor proportions each of finely divided carbon and dispersed oil-insoluble bitumen.

8. An oil base drilling fluid comprising a petroleum hydrocarbon oil, spent adsorbent, a minor proportion of finely divided carbon and from ½ to 10% by weight of dispersed oil-insoluble bitumen.

9. In the drilling of wells with the use of a drilling fluid the method of forming a filter cake impermeable to the outward flow of fluid during drilling which comprises circulating through the well a drilling fluid comprising a petroleum hydrocarbon oil, a finely divided oil-wettable solid and dispersed oil-insoluble bitumen.

10. In the drilling of wells with an oil base drilling fluid comprising a petroleum hydrocarbon oil, a finely divided oil-wettable solid and dispersed oil-insoluble bitumen the step of rendering the filter cake formed by the drilling fluid permeable to the inward flow of oil from an oil sand which comprises treating the filter cake with a solvent for the oil-insoluble bitumen.

11. An oil base drilling fluid comprising a petroleum hydrocarbon oil and dispersed solid which is insoluble in the petroleum hydrocarbon oil but readily soluble in a solvent selected from the group consisting of aromatic, chlorinated aromatic, nitrated aromatic and chlorinated aliphatic solvents, said drilling fluid having the property of forming during drilling operations a filter cake on a well bore which is substantially impermeable to the outward flow of oil of the drilling fluid from the well bore into the surrounding formation, the said filter cake being rendered readily permeable to the inward flow of oil from the formation into the well bore by treatment with said solvent.

12. An oil base drilling fluid according to claim 11, in which the dispersed solid is an oil-insoluble bitumen.

13. An oil base drilling fluid according to claim 11, in which the dispersed solid is a sulfurized asphalt.

14. The method of drilling and producing an oil well which comprises circulating in the bore hole of the well during drilling an oil base drilling fluid comprising petroleum hydrocarbon oil and a dispersed solid which is insoluble in the petroleum hydrocarbon oil but readily soluble in a solvent selected from the group consisting of aromatic, chlorinated aromatic, nitrated aromatic and chlorinated aliphatic solvents, to thereby form a filter cake about the bore hole of the well which is substantially impermeable to the outward flow of oil of the drilling fluid from the well bore into the surrounding formation, and thereafter treating the filter cake with a solvent selected from the group mentioned to render the filter cake readily permeable to the inward flow of oil from a producing formation into the well bore.

15. The method according to claim 14, in which the dispersed solid is an oil-insoluble bitumen.

16. The method according to claim 14, in which the dispersed solid is a sulfurized asphalt.

ALLEN D. GARRISON.

CERTIFICATE OF CORRECTION.

Patent No. 2,241,255.  May 6, 1941.

ALLEN D. GARRISON.

It is hereby certified that error appears in the printed specification of the above numbered patent requiring correction as follows: Page 2, second column, line 43, claim 3, for "oil-soluble" read --oil-insoluble--; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.